United States Patent
Ganesh

(10) Patent No.: US 8,549,532 B2
(45) Date of Patent: Oct. 1, 2013

(54) PARALLEL CHECKPOINTING FOR MIGRATION OF WORKLOAD PARTITIONS

(75) Inventor: Perinkulam I. Ganesh, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 489 days.

(21) Appl. No.: 12/834,038

(22) Filed: Jul. 12, 2010

(65) Prior Publication Data

US 2012/0011519 A1 Jan. 12, 2012

(51) Int. Cl.
G06F 9/46 (2006.01)
G06F 9/455 (2006.01)
G06F 12/00 (2006.01)
G06F 11/00 (2006.01)

(52) U.S. Cl.
USPC ............ 718/105; 718/1; 718/100; 718/106; 711/162; 714/13

(58) Field of Classification Search
None
See application file for complete search history.

(56) References Cited

U.S. PATENT DOCUMENTS

| | | | |
|---|---|---|---|
| 6,338,147 B1 * | 1/2002 | Meth et al. | 714/13 |
| 7,743,381 B1 * | 6/2010 | Tran | 718/106 |
| 8,214,367 B2 * | 7/2012 | Baratto et al. | 707/739 |
| 2002/0170015 A1 * | 11/2002 | Hornung et al. | 714/766 |
| 2006/0218364 A1 * | 9/2006 | Kitamura | 711/162 |
| 2008/0267176 A1 | 10/2008 | Ganesh et al. | |
| 2008/0270422 A1 | 10/2008 | Craft et al. | |
| 2008/0270829 A1 | 10/2008 | Craft et al. | |
| 2008/0294703 A1 | 11/2008 | Craft et al. | |
| 2008/0295111 A1 * | 11/2008 | Craft et al. | 719/313 |
| 2008/0320122 A1 | 12/2008 | Houlihan et al. | |
| 2008/0320123 A1 | 12/2008 | Houlihan et al. | |
| 2008/0320269 A1 | 12/2008 | Houlihan et al. | |
| 2009/0019308 A1 * | 1/2009 | Amano | 714/19 |
| 2009/0037550 A1 | 2/2009 | Mishra et al. | |
| 2009/0094445 A1 | 4/2009 | Brandyberry et al. | |
| 2009/0094582 A1 | 4/2009 | Craft et al. | |
| 2009/0094624 A1 | 4/2009 | Craft et al. | |
| 2009/0112965 A1 * | 4/2009 | Ganesh et al. | 709/201 |
| 2009/0112969 A1 | 4/2009 | Ganesh et al. | |
| 2009/0157882 A1 | 6/2009 | Kashyap | |
| 2010/0082816 A1 | 4/2010 | Kharat et al. | |
| 2010/0083283 A1 | 4/2010 | Kharat et al. | |
| 2010/0094948 A1 | 4/2010 | Ganesh et al. | |

* cited by examiner

Primary Examiner — Jennifer To
Assistant Examiner — Tammy Lee
(74) Attorney, Agent, or Firm — DeLizio Gilliam, PLLC

(57) ABSTRACT

A method includes receiving a command for migration of a workload partition having multiple processes from a source machine to a target machine. The method includes executing, for each of the multiple processes at least partially in parallel, an operation to create checkpoint data. The operation to create the checkpoint data provides an estimation of a size of the checkpoint data that is needed for migration, wherein the operation to create the checkpoint data is independent of storing the checkpoint data in the file. The method includes allocating areas within the file for storage of the checkpoint data for each of the multiple processes. The method includes storing the checkpoint data, for each of the multiple processes at least partially in parallel, into the areas allocated within the file based on offsets in the file for each of the multiple processes.

26 Claims, 5 Drawing Sheets

PARALLEL CHECKPOINTING FOR MIGRATION OF WORKLOAD PARTITIONS

BACKGROUND

Various computing platforms for large processing operations and data centers can provide services for databases, web hosting, virtualized environments, etc. A number of these large computing platforms incorporate multiple servers. The processing operations and data can be spread across these multiple servers. Some configurations can require that the server be shut down for servicing (upgrades, repairs, etc.). To enable this servicing with disrupting the services being provided, the processes and data can be migrated from a first hardware resource (e.g., a first server) to a second hardware resource (e.g., a second server). In particular, the processes and data can be part of a logical partition (e.g., a workload partition (WPAR)) that is migrated from the first hardware resource to the second hardware resource.

SUMMARY

Embodiments include a method that comprises receiving a command for migration of a workload partition from a source machine to a target machine. The workload partition comprises multiple processes. The migration occurs through transmission of a file storing checkpoint data for the multiple processes, wherein the checkpoint data comprises data utilized to reinstantiate states of the multiple processes on the target machine. The method includes stopping execution of the multiple processes executing on the source machine. The method also includes creating the checkpoint data for each of the multiple processes. The creating comprises executing, for each of the multiple processes at least partially in parallel, a checkpoint data creation operation. The creating also comprises estimating a size of the checkpoint data that is utilized for migration, wherein an execution of the checkpoint data creation operation is independent of storing the checkpoint data in the file. The method includes allocating areas within the file for storage of the checkpoint data for each of the multiple processes, wherein sizes of the areas are defined by the estimation of the size of the checkpoint data provided by the checkpoint data creation operation. The method also includes defining an offset in the file for each of the multiple processes. The method includes storing the checkpoint data, for each of the multiple processes at least partially in parallel, into the areas allocated within the file based on the offset in the file for each of the multiple processes. The method includes outputting the file for the migration of the workload partition from the source machine to the target machine.

Embodiments include a source machine that comprises a processor. The source machine also includes a checkpoint module executable on the processor and configured to receive a command to migrate a workload partition from the source machine to a target machine by transmission of a file that comprises checkpoint data. The source machine includes a first process executable on the processor in the workload partition. The first process comprises a first checkpoint program configured to execute a first operation to create a first part of the checkpoint data that is needed to migrate the first process from the source machine to the target machine. The first operation is to create the first part to provide an estimation of a size of the first part that is needed for migration. Also, the first operation is to create the first part of the checkpoint data independent of storage of the first part of the checkpoint data in the file. The source machine includes a second process executable on the processor in the workload partition. The second process comprises a second checkpoint program configured to execute a second operation to create a second part of the checkpoint data that is needed to migrate the second process from the source machine to the target machine. The second operation is to create the second part to provide an estimation of a size of the second part that is needed for migration. The second operation is to create the second part of the checkpoint data independent of storage of the second part of the checkpoint data in the file. The checkpoint module is configured to allocate areas within the file for storage of the first part and the second part of the checkpoint data. Sizes of the areas are defined by the estimation of the size of the first part and the second part of the checkpoint data provided by the executing of the first and second operations to create the checkpoint data. The checkpoint module is configured to define an offset in the file for the first and second processes. The checkpoint module is also configured to store the first part and the second part of the checkpoint data, at least partially in parallel, into the areas allocated within the file based on the offset in the file for the first and second processes. The checkpoint module is configured to output the file for the migration of the workload partition from the source machine to the target machine.

Embodiments include a computer program product for migration of a workload partition. The computer program product includes a computer readable storage medium having computer readable program code embodied therewith. The computer readable program code is configured to receive a command for migration of a workload partition from a source machine to a target machine. The workload partition comprises multiple processes. The migration occurs through transmission of a file storing checkpoint data for the multiple processes, wherein the checkpoint data comprises data utilized to reinstantiate states of the multiple processes on the target machine. The computer readable program code is configured to stop execution of the multiple processes executing on the source machine. The computer readable program code is configured to create the checkpoint data for each of the multiple processes. The creation of the checkpoint data is configured to execute, for each of the multiple processes at least partially in parallel, a checkpoint data creation operation. The creation of the checkpoint data is configured to estimate a size of the checkpoint data that is utilized for migration, wherein an execution of the checkpoint data creation operation is independent of storing the checkpoint data in the file. The computer readable program code is configured to allocate areas within the file for storage of the checkpoint data for each of the multiple processes, wherein sizes of the areas are defined by the estimation of the size of the checkpoint data provided by the checkpoint data creation operation. The computer readable program code is configured to define an offset in the file for each of the multiple processes. The computer readable program code is configured to store the checkpoint data, for each of the multiple processes at least partially in parallel, into the areas allocated within the file based on the offset in the file for each of the multiple processes. The computer readable program code is configured to output the file for the migration of the workload partition from the source machine to the target machine.

Embodiments include a method comprising receiving checkpoint data in a file for migration of a workload partition from a source machine into a target machine. The workload partition comprises a first process and a second process. The method includes instantiating the first process, identified in the checkpoint data, in the workload partition on the target machine. The method also includes instantiating the second process, identified in the checkpoint data, in the workload partition on the target machine. The method includes extracting the checkpoint data for the first process that is located at a first offset in the file. The method includes extracting, at least partially in parallel with the extracting of the checkpoint data for the first process, the checkpoint data for the second process that is located at a second offset in the file. The method includes recreating a state of the first process using the checkpoint data that is extracted from the first offset in the file. The method also includes recreating, at least partially in parallel with the recreating of the state of the first process, a state of the second process using the checkpoint data that is extracted from the second offset in the file. The method includes resuming execution of the first process and the second process in the workload partition on the target machine.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
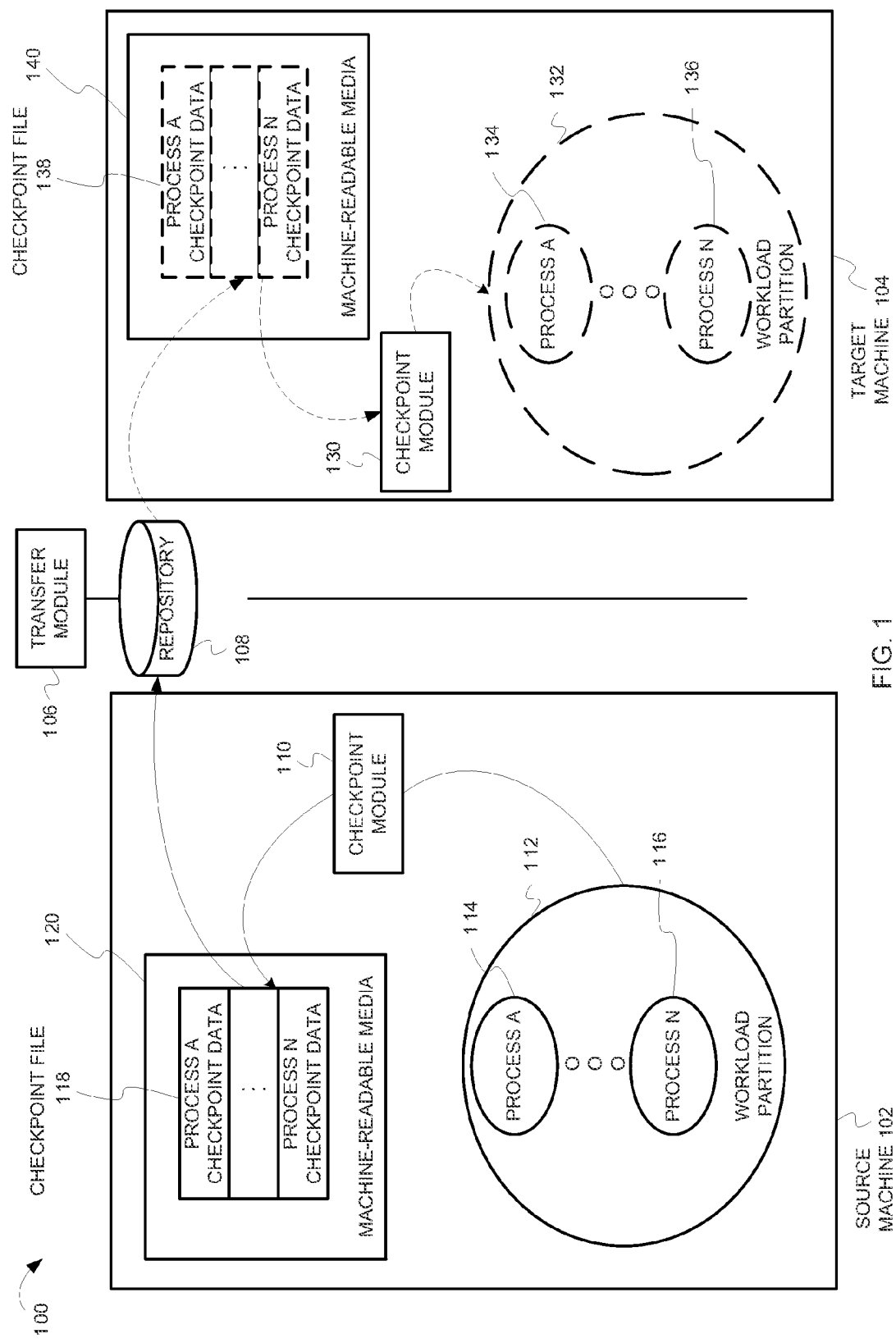
FIG. 1 is a block diagram illustrating migration of a workload partition from a source machine to a target machine, according to some example embodiments.

The description that follows includes exemplary systems, methods, techniques, instruction sequences, and computer program products that embody techniques of the present inventive subject matter. However, it is understood that the described embodiments may be practiced without these specific details. In other instances, well-known instruction instances, protocols, structures, and techniques have not been shown in detail in order not to obfuscate the description.

Some example embodiments include a virtual input output server (VIOS). A VIOS allows sharing of physical resources between logical partitions (LPARs). An LPAR is generally a subset of a computer's hardware resources, where the subset is virtualized and an LPAR can operate as a separate computing device. In effect, a physical machine can be partitioned into multiple LPARs, each housing a separate operating system. A VIOS can operate as a partitioned hardware adapter and can service end devices or logical devices such as an Internet small computer system interface (iSCSI) adapter, compatible disks, Fibre-Channel disks, Ethernet drives, compact disks (CD), digital video disks (DVD), and optical drives or devices. A VIOS, therefore, can allow for sharing of physical resources of the device(s) among multiple virtual machines. For instance, a computer device can execute multiple operating system images at a same time while the operating systems are isolated from each other across multiple virtual machines.

The LPARs can include multiple workload partitions (WPARs). In particular, one feature that can facilitate moving a workload or a workload partition from hardware resource to hardware resource is code that is set up to operate as a workload partition. Accordingly an LPAR can be broken up into multiple WPARSs. Generally, mobile WPARs are WPARs that have characteristics that allow the workload partition to be moved or migrated from physical machine to physical machine, or from a source machine to a target machine. WPARs can be multiple virtual operating environment that operate within a single copy of an operating system. Processes can have a private execution environment. The processes can be isolated in terms of process, signal and file system. Further, processes can have their own unique users, groups, and dedicated network addresses. Inter-process communication can be restricted to processes executing in the same workload partition. Accordingly, a WPAR can be transparent as most processes are unaware of the software creating the workload partition and thus most applications can run, unmodified in a WPAR. Workload partitions can establish limits on threads, processes, etc. Also, a LPAR is not required to create a WPAR for a machine. Accordingly, a machine can include a WPAR without a LPAR thereon. Also, a WPAR can be given ownership of a physical resource (e.g., drive, adapter, etc.). If there is no LPAR, when an operating system is installed on the machine, the operating system can have ownership and management of the physical resources of the machine. Accordingly, the operating system can give ownership of a physical resource to a WPAR.

To migrate the mobile WPARs, data (known as checkpoint data) is transferred from the source resource to a common repository. The target resource can then access the checkpoint data from the common repository. In conventional systems for migration of mobile WPARs, the entire checkpoint data is written to the common repository in a multilevel directory structure that included multiple files (in some instances including hundreds of files). Such a configuration can affect high performance computing because of the requirement to manage multiple files. In particular, the file open operations for each of a large number of files can slow down the migration of the workload partition. Some example embodiments checkpoint multiple processes at least partially in parallel in a single file. The operations can be performed partly in a user space and partly from the kernel of the operating system. The kernel can provide the infrastructure, while the user space controls the checkpoint operations.

In some example embodiments, the storage of the checkpoint data into a single file is divided into two operations for each of the multiple processes. For each process, a first operation determines a size of the checkpoint data. This first operation can be performed at least partially in parallel for the different processes. A second operation creates and stores the checkpoint data into a single file using offsets in the file that are derived from the determined sizes of the checkpoint data. This second operation can also be performed at least partially in parallel for the different processes.

The size of the checkpoint data can be determined by performing fake write operation of the checkpoint data that is without storing the checkpoint data into the checkpoint file that is used to store the checkpoint data for subsequent migration to the target machine. In some example embodiments, the write operation is needed to determine the size of the checkpoint data because of the dependency of the various checkpoint data. In particular, during the creation of the checkpoint data, a first segment of the process can affect the size of the checkpoint data for a second segment of the process (e.g., creation of the checkpoint data for the heap can affect the size of the checkpoint data for the stack).

In some example embodiments, a program (termed a checkpoint program) is instantiated for each of the multiple processes within a memory space for the processes. These checkpoint programs are used to execute the two-part operations for storage of the checkpoint data into the checkpoint file. In some example embodiments, the retexted checkpoint program is instantiated within a text segment of a process. The text segment can be used for the retexted checkpoint program because the data stored in the text segment is not needed to create the checkpoint data. The retexted checkpoint program can perform the write operation without storing the checkpoint data into the checkpoint file. The retexted checkpoint program can then provide a size of the checkpoint data. Accordingly, offsets in the file (where the checkpoint data for each of the processes are written) can be determined. In the second part of the operation, the retexted checkpoint programs for the different processes can then write to their respective offsets in the same checkpoint file, at least partially in parallel. Some example embodiments are described such that a partition is migrated from one machine to a different machine. Alternatively, in some other example embodiments, the partition is recreated on a same machine.

FIG. 1 is a block diagram illustrating migration of a workload partition from a source machine to a target machine, according to some example embodiments. A source machine 102 is communicatively coupled over a network to a transfer module 106 a repository 108. Similarly, the target machine 104 is communicatively coupled over a network to the transfer module 106 and the repository 108. The transfer module 106 and repository 108 can be on same or different machines (e.g., servers).

The source machine 102 includes a workload partition 112 and a checkpoint module 110. The workload partition 112 can include one to N number of processes executing therein (process A 114, process N 116, etc.). While not shown, the workload partition 112 can be part of a logical partition (LPAR). Also not shown, the source machine 102 can have one to N number of logical partitions that can include one to N number of workload partitions. The checkpoint module 110 can create a checkpoint file 118 that can be stored in a machine-readable media 120. The machine-readable media 120 can be any combination of volatile and nonvolatile machine-readable media. For example, the machine-readable media 120 can be random access memory, a mass storage device (e.g., hard disk drive), etc.

In some example embodiments, the checkpoint data for the different processes are stored in a single file (the checkpoint file 118). The checkpoint data is derived from the data associated with and the processes executing in the workload partition 112. The checkpoint data includes instructions to restart the process, recreate the data, etc. on the target machine 104. For example, the checkpoint data can include loader data (e.g., shared library data), the heap and stack for a given process, etc. In this example embodiment, the transfer module 106 stores the checkpoint file 118 in the repository 108.

As further described below, the storage of checkpoint data into the checkpoint file 118 can occur using two operations. A first operation determines a size of each checkpoint data. The first operation provides an allocation and an offset within the checkpoint file 118 for each process where storage of the associated checkpoint data begins. Such allocations prevent an overwriting of checkpoint data from one process by writing of checkpoint data from a different process. In some example embodiments, this first operation is an operation to create the checkpoint data, wherein the checkpoint data is not actually stored in the checkpoint file 118. The second operation stores the checkpoint data into the checkpoint file 118 based on these allocations and offsets. A more detailed description, in accordance with some example embodiments, of the allocation of and storage of data into the checkpoint file 118 is set forth below in reference to FIG. 2.

The target machine 104 includes a checkpoint module 130. As shown, the transfer module 106 downloads a checkpoint file 138 into a machine-readable media 140. The machine-readable media 120 can be any combination of volatile and nonvolatile machine-readable media. For example, the machine-readable media 120 can be random access memory, a mass storage device (e.g., hard disk drive), etc. The checkpoint file 138 comprises a copy of the checkpoint file 118. Accordingly, the checkpoint file 138 comprises the checkpoint data for each of the processes that were executing on the source machine 102. Using the checkpoint data, the checkpoint module 130 can recreate the workload partition 112 that had been executing on the source machine 102 as a workload partition 132 executing on the target machine 104. In particular, the checkpoint module 130 can instantiate each of the processes from the source machine 102 (the process A 114, the process N 116, etc.) onto the target machine 104 (shown as a process A 134, a process N 136, etc.). Also using the checkpoint data, the checkpoint module 130 can reinstantiate the state of each process. In other words, the states of the process A 114, the process 116, etc. are the same as the states of the process A 134, the process 136, etc., respectively.

While described such that the checkpoint data is stored and then retrieved from the repository 108, in some other example embodiments, the source machine 102 can transmit the checkpoint data directly to the target machine 104. Also, the source machine 102 and the target machine 104 can include a number of different other components (not shown). A more detailed example of one of these machines having multiple workload partitions is described below in conjunction with FIG. 5.

Figure 2:
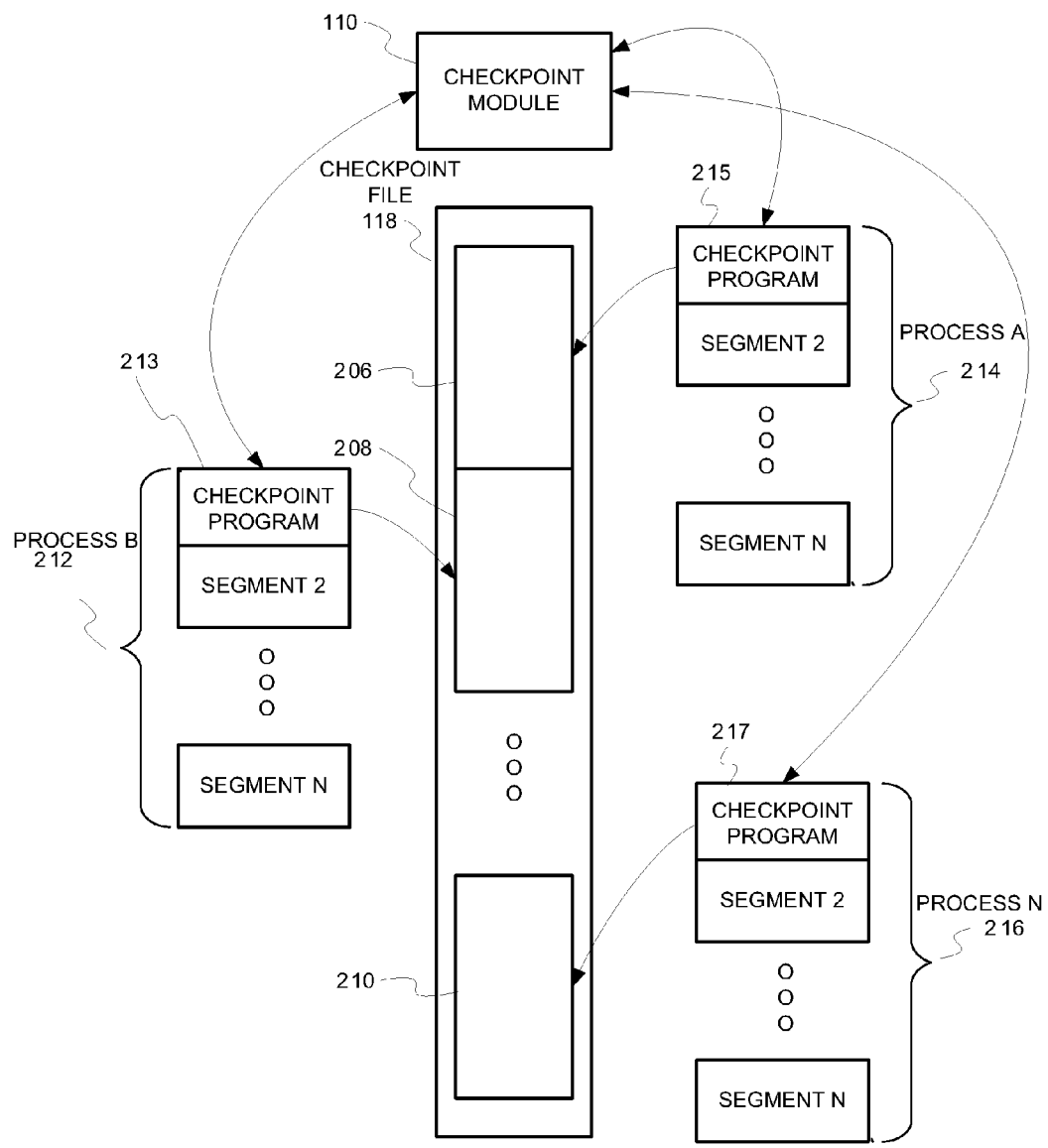
FIG. 2 is a block diagram illustrating the storage of checkpoint data of multiples processes in a single file, according to some example embodiments.

FIG. 2 is a block diagram illustrating the storage of checkpoint data of multiples processes in a single file, according to some example embodiments. FIG. 2 includes the checkpoint module 110 and the checkpoint file 118. FIG. 2 includes a process A 214, a process B 212, a process N 216, etc. In this example, each process includes a checkpoint program within its own memory space. In some example embodiments, the checkpoint program is within a text segment of the process. The process A 214 includes a checkpoint program 215. The process B 212 includes a checkpoint program 213. The process N 216 includes a checkpoint program 217. Each of process A 214, process B 212 and process N 216 also includes a number of other segments (shown as segment 2 to segment N). The segments can be for storage of a heap, a stack, etc. for the processes.

The checkpoint program for a given process can be used to execute a two-part operation for storage of checkpoint data for a given process. In the first part, the checkpoint programs 213-217 can determine a size of the checkpoint data for a given process. In some example embodiments, this first part is an operation to create the checkpoint data, wherein the checkpoint data is not actually stored in the checkpoint file 118. In other words, the checkpoint programs 213-217 execute the process for storing the checkpoint data without storing the checkpoint data in the checkpoint file 118. This execution of the process is needed to determine the size of the checkpoint data because of the dependency of the various checkpoint data. In particular, during the creation of the checkpoint data, a first segment of the process can affect the size of the checkpoint data for a second segment of the process (e.g., creation of the checkpoint data for the heap can affect the size of the checkpoint data for the stack). Accordingly, each segment of a process needed for the checkpoint data cannot be viewed in isolation from each other. The checkpoint data for a process can scattered over various segments. Also, a process may not use all of the space within a segment. Hence, computing the checkpoint data is an elaborate process and not merely a cumulative sum of the size of the various segments used by the process.

The checkpoint programs 213-217 of the different processes can then transmit the sizes (e.g., 10 kilobytes, 15 kilobytes, etc.) to the checkpoint module 110. The checkpoint module 110 can then allocate parts of the checkpoint file 118 for storage of checkpoint data for the different processes. In this example, the checkpoint module 110 allocates a part 206 for the checkpoint data for the process A 214. The checkpoint module 110 allocates a part 208 for the checkpoint data for the process B 212. The checkpoint module 110 allocates a part 210 for the checkpoint data for the process N 216. Accordingly, the checkpoint module 110 returns, to each of the checkpoint programs 213-217, the offset in the checkpoint file 118 where the respective checkpoint data is to be stored. In this example, the checkpoint module 110 returns the beginning of the part 206 as the offset to the checkpoint program 215 for storage of the checkpoint data for the process A 214. The checkpoint module 110 returns the beginning of the part 208 as the offset to the checkpoint program 213 for storage of the checkpoint data for the process B 212. The checkpoint module 110 returns the beginning of the part 210 as the offset to the checkpoint program 217 for storage of the checkpoint data for the process B 216.

As shown, in some example embodiments, the storage of the checkpoint data for the different processes is stored contiguously. Some example embodiments allow for contiguous storage because of the determination of the sizes of each checkpoint data prior to actual storage. Also, in some example embodiments, some of the operations are performed at least partially in parallel. For example, the first and second parts of the two-part operations performed by the multiple checkpoint programs can be performed at least partially in parallel. In particular, the multiple checkpoint programs can determine the size of the checkpoint data for their respective processes at least partially in parallel. Also, the multiple checkpoint programs can store the checkpoint data for their respective processes at least partially in parallel. Such parallel operations on a single file are enabled because the write operations to the file do not lock the file to prevent other writes. Accordingly, multiple writes can be executed on the checkpoint file 118.

Because of the use of a single file for the different checkpoint data, performance of the migration is increased. In particular, only one file open operation is needed for the storage of the different checkpoint data. This is in contrast to conventional systems where a large number of files are required for migration of the workload partition from a source machine to a target machine (e.g., file per process). Therefore in some applications, the number of file openings can be in the hundreds. While described such that the determination of the size of the checkpoint data and the storage of the checkpoint data is performed by a program instantiated in a memory space of the associated process, embodiments are not so limited. In some other example embodiments, these programs can be executing in a separate memory space in the source machine or any other machine communicatively coupled thereto.

Figure 3:
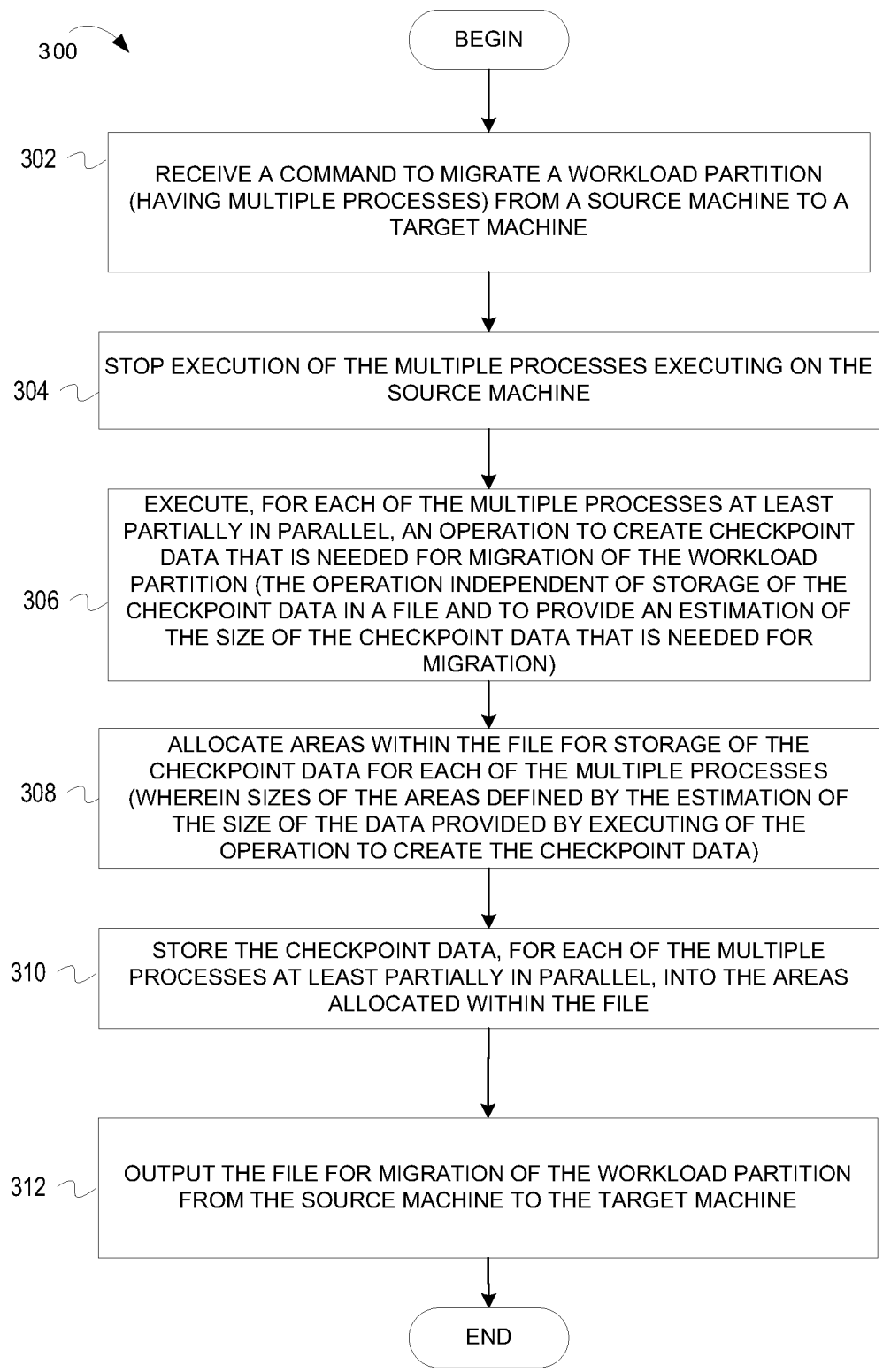
FIG. 3 is a flowchart illustrating storage of checkpoint data for multiple processes for workload partition migration, according to some example embodiments.
Figure 4:
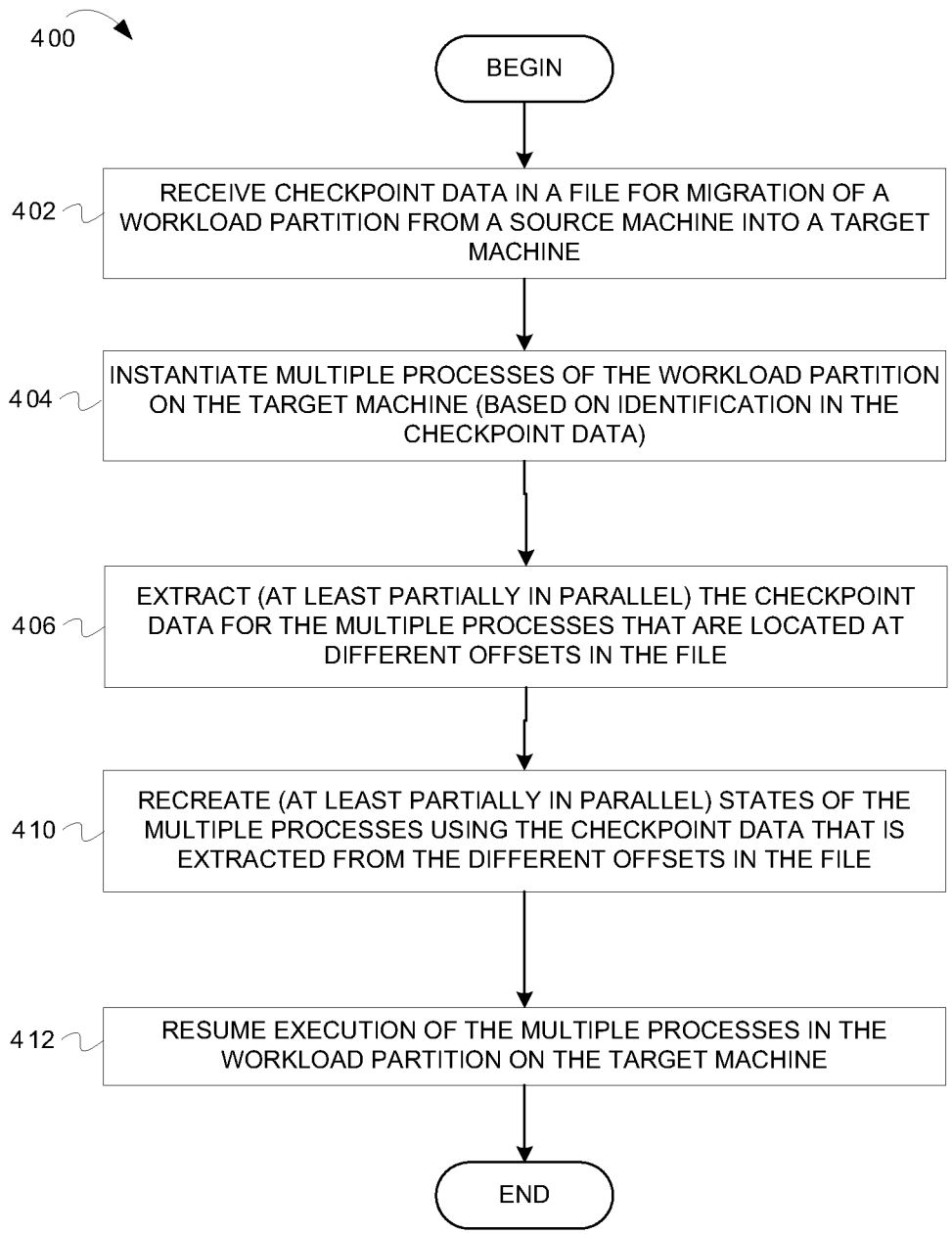
FIG. 4 is a flowchart illustrating receiving and reinstantiating multiple processes of a workload partition, according to some example embodiments.

Operations for migration of a workload partition are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart. Two different flowcharts are now described. FIG. 3 is from a perspective of the source machine for storage of checkpoint data for workload partition migration. FIG. 4 is from a perspective of the target machine for receiving and reinstantiating the multiple processes of the workload partition.

In particular, FIG. 3 is a flowchart illustrating storage of checkpoint data for multiple processes for workload partition migration, according to some example embodiments. A flowchart 300 includes operations that can be performed by components on the source machine 102 described in reference to FIGS. 1-2. Therefore, FIG. 3 is described with reference to FIGS. 1-2.

The checkpoint module 110 receives a command to migrate the workload partition 116 (having multiple processes 114-116) from the source machine 102 to the target machine 104 (302). The command can be received from the transfer module 106 or other control module not shown. For example, the command can be received in response to a determination that the source machine 102 is being shut down for maintenance, upgrade to hardware, software, or firmware, etc. Accordingly, the workload partition is to be migrated so that the processes can continue running without materially affecting the users executing the processes.

The checkpoint module 110 stops execution of the multiple processes 114-116 executing on the source machine 102 (304). The checkpoint module 110 can transmit a stop command to each of the processes 114-116. The processes 114-116 can suspends its operations at a subsequent point in time where the state and associated data of the process can be saved and migrated to the target machine 104.

Each of the checkpoint programs 213-217 execute, for the associated processes 212-216 and at least partially in parallel, an operation to create checkpoint data that is needed for migration of the workload partition 112 from the source machine 102 to the target machine 104 (306). In some example embodiments, the checkpoint programs 213-217 create the checkpoint data without (or independent of) storage of the checkpoint data into the single checkpoint file used for storage of checkpoint data for all of the processes in the workload partition 112. Accordingly, the checkpoint programs 213-217 walk through the process of creating the checkpoint data for storage without completion the operation of actually storage of the checkpoint data into the checkpoint file 118. This execution of the process is needed to determine the size of the checkpoint data because of the dependency of the various checkpoint data. Accordingly, each segment of a process needed for the checkpoint data cannot be viewed in isolation from each other. A result of the execution of the operation to create the checkpoint data is a size of the checkpoint data. The checkpoint programs 213-217 returns the sizes of the checkpoint data for each of the processes 212-216 to the checkpoint module 110.

The checkpoint module 110 allocates areas within the checkpoint file 118 for storage of the checkpoint data for each of the multiple processes 212-216 (308). In particular, the checkpoint module 110 allocates based on the sizes of the checkpoint data for each of the processes 212-216 provided by the checkpoint programs 213-217. In some example embodiments, the allocation is such that the checkpoint data from the different processes 212-216 is stored contiguously in the checkpoint file 118. As a result of the allocation, the checkpoint module 110 defines offsets within the checkpoint file where the checkpoint data from the different processes 212-216 are to be stored. The checkpoint module 110 returns these offsets to the checkpoint programs 213-217.

The checkpoint programs 213-217 stores the checkpoint data for each of their respective processes 212-216, at least partially in parallel, into the areas allocated within the checkpoint file 118 (310). In particular, the checkpoint programs 213-217 store the checkpoint data starting at the offset provided by the checkpoint module 110. With reference to FIG. 2, the checkpoint program 215 stores the checkpoint data for the process A 214 starting at the beginning of part 206 of the checkpoint file 118. The checkpoint program 213 stores the checkpoint data for the process B 212 starting at the beginning of part 208 of the checkpoint file 118. The checkpoint program 217 stores the checkpoint data for the process N 216 starting at the beginning of part 210 of the checkpoint file 118. Also, the checkpoint programs 213-217 are able to store the checkpoint data at least partially in parallel because the checkpoint file 118 is not locked during the write operations. Accordingly, multiple stores can occur at a same time on the checkpoint file 118. In some example embodiments, the checkpoint programs 213-217 can transmit an indication that the storage of the checkpoint data is complete back to the checkpoint module 110.

The checkpoint module 110 outputs the checkpoint file 118 for migration of the workload partition 112 from the source machine 102 to the target machine 104 (312). For example, the checkpoint module 110 can output the checkpoint file 118 for storage in the repository 108. Alternatively or in addition, the checkpoint module 110 can output the checkpoint file 118 directly to the target machine 104. The operations of the flowchart 300 are complete.

The processing of the migrated workload partition by the target machine 104 is now descried. In particular, FIG. 4 is a flowchart illustrating receiving and reinstantiating multiple processes of a workload partition, according to some example embodiments. A flowchart 400 includes operations that can be performed by components on the target machine 102 described in reference to FIGS. 1-2. Therefore, FIG. 4 is described with reference to FIGS. 1-2.

The checkpoint module 130 receives the checkpoint data in the checkpoint file 138 for migration of a workload partition from the source machine 102 to the target machine 104 (402). As described above, the checkpoint module 130 can retrieve the checkpoint file 138 from the repository 108. Alternatively or in addition, the checkpoint module 130 can receive the checkpoint file 138 from the source machine 102. As shown, the checkpoint module 130 can store the checkpoint file 138 into the machine-readable media 140.

The checkpoint module 130 instantiates the multiple processes (134-136) of the workload partition 132 on the target machine 104 (404). The checkpoint module 130 can identify the processes to be instantiated based on the data in the checkpoint file 138. For example, the checkpoint file 138 can store header information identifying the number, type, offset, etc. of processes represented by the checkpoint data stored therein. In some example embodiments, as part of the instantiation of the processes 134-136, the checkpoint module 130 also instantiates the checkpoint programs within a memory space of each of the multiple processes 134-136.

The checkpoint programs extracts (at least partially in parallel with each other) the checkpoint data for each of the multiple processes 134-136 that are located at different offsets in the checkpoint file 138 (406). With reference to FIG. 2, the checkpoint programs would extract the checkpoint data starting at the beginning of the part 206, the part 208, and the part 210 of the checkpoint file 138 for their respective processes.

The checkpoint programs recreate (at least partially in parallel with each other) states of their respective processes using the checkpoint data that is extracted from the different offsets in the checkpoint file 138 (410). For example, the checkpoint programs can recreate the loader data, the heap, the stack, etc. such that the processes can resume at the same point where execution stopped on the target machine (see 304 of FIG. 3). In some example embodiments, the checkpoint programs can transmit an indication that the recreation of the states of their respective processes is complete back to the checkpoint module 130.

The checkpoint module 130 resumes execution of the multiple processes 134-136 in the workload partition 132 on the target machine 104 (412). Accordingly, the processes 134-136 resume execution at the same point where the execution was stopped on the source machine 102. The operations of the flowchart 400 are complete.

Figure 5:
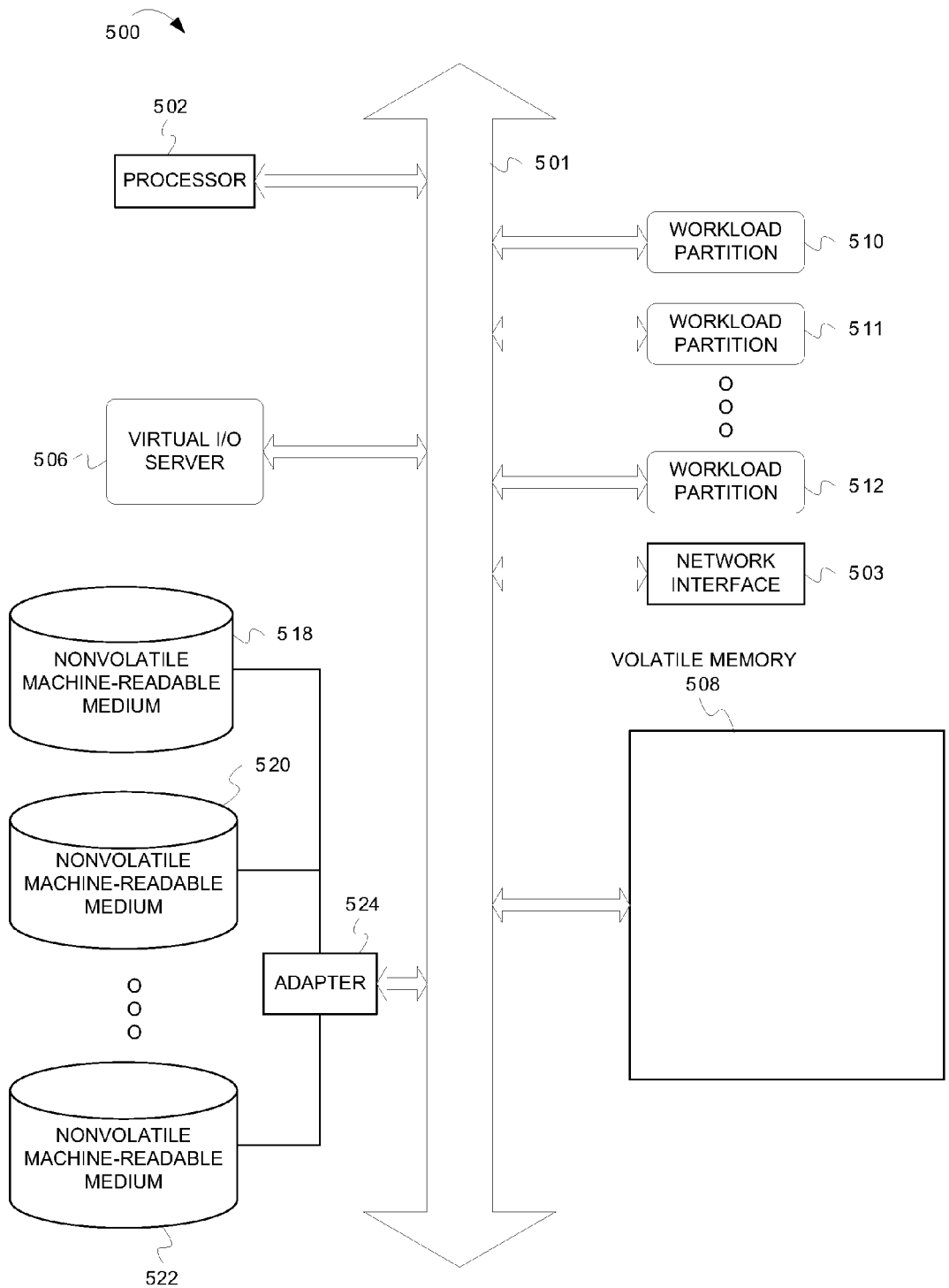
FIG. 5 is a block diagram illustrating a computer device with multiple workload partitions, according to some example embodiments.

FIG. 5 is a block diagram illustrating a computer device with multiple workload partitions, according to some example embodiments. A computer device 500 includes a processor 502 (possibly including multiple processors, multiple cores, multiple nodes, and/or implementing multithreading, etc.). The computer device 500 includes a nonvolatile machine-readable medium 518, a nonvolatile machine-readable medium 520 and a nonvolatile machine-readable medium 522 that are communicatively coupled to the bus 501 through an adapter 524. The nonvolatile machine-readable media 518-522 can be various types of hard disk drives (e.g., optical storage, magnetic storage, etc.). The computer device 500 also includes a bus 501 (e.g., PCI, ISA, PCI-Express, HyperTransport®, InfiniBand®, NuBus, etc.) and a network interface 503 (e.g., an ATM interface, an Ethernet interface, a Frame Relay interface, SONET interface, wireless interface, etc.).

The computer device 500 includes a virtual I/O server 506 and a number of workload partitions (a workload partition 510, a workload partition 511 and a workload partition 512). In some example embodiments, each of the workload partitions 510-512 serves as a software implementation of a machine. Each of the workload partition 510-512 can provide a system platform that enables execution of an operating system. The workload partition 510-512 share physical resources of the computer device 500.

The operations of the virtual I/O server 506 and the workload partitions 510-512 can be partially (or entirely) implemented in hardware and/or on the processor 502. For example, the operations can be implemented with an application specific integrated circuit, in logic implemented in the processor 502, in a co-processor on a peripheral device or card, etc. The computer device 500 includes a volatile memory 508. The volatile memory 508 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the below described possible realizations of machine-readable media.

Further, realizations may include fewer or additional components not illustrated in FIG. 5 (e.g., video cards, audio cards, additional network interfaces, peripheral devices, etc.). The processor 502, the volatile memory 508, the nonvolatile machine-readable media 518-522, the virtual I/O server 506, the workload partitions 510-512, and the network interface 503 are coupled to the bus 501. Although illustrated as being coupled to a bus 501, the volatile memory 508 can be coupled to the processor 502.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for workload partition migration as described herein may be implemented with facilities consistent with any system or systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving a command for migration of a workload partition from a source machine to a target machine, the workload partition comprising multiple processes, wherein the migration occurs through transmission of a file storing checkpoint data for the multiple processes, wherein the checkpoint data comprises data utilized to reinstantiate states of the multiple processes on the target machine;
stopping execution of the multiple processes executing on the source machine;

creating the checkpoint data for each of the multiple processes, wherein said creating comprises,
executing, for each of the multiple processes at least partially in parallel, a checkpoint data creation operation, wherein an execution of the checkpoint data creation operation comprises,
estimating a size of the checkpoint data that is utilized for migration, wherein the estimating is derived by writing the checkpoint data to a location in machine-readable media to determine the size of the checkpoint data, wherein the location in the machine-readable media does not include a location of the file, wherein the writing of the checkpoint data to the machine-readable media to determine the size is separate from and prior to storage of the checkpoint data in the file, wherein the execution of the checkpoint data creation operation is independent of storing the checkpoint data in the file;
allocating areas within the file for storage of the checkpoint data for each of the multiple processes, wherein sizes of the areas are defined by the estimation of the size of the checkpoint data provided by the checkpoint data creation operation;
defining an offset in the file for each of the multiple processes;
storing the checkpoint data, for each of the multiple processes at least partially in parallel, into the areas allocated within the file based on the offset in the file for each of the multiple processes; and
outputting the file for the migration of the workload partition from the source machine to the target machine.

2. The method of claim 1, wherein the storing of the checkpoint data comprises
storing a first part of the checkpoint data for a first process of the multiple processes at a first offset in the file; and
storing a second part of the checkpoint data for a second process of the multiple processes at a second offset in the file.

3. The method of claim 2, wherein the first part and the second part are contiguous.

4. The method of claim 1, wherein the checkpoint data creation operation is executed within a segment of each of the multiple processes that is not storing data needed to create the checkpoint data.

5. The method of claim 4, wherein the segment comprises a text segment.

6. The method of claim 1, wherein the areas of the file are contiguous.

7. The method of claim 1, wherein a size of the checkpoint data for a first process of the multiple processes is dependent on creating of the checkpoint data for a second process of the multiple processes.

8. A source machine comprising:
a processor;
a checkpoint module executable on the processor and configured to receive a command to migrate a workload partition from the source machine to a target machine by transmission of a file that comprises checkpoint data;
a first process executable on the processor in the workload partition, wherein the first process comprises a first checkpoint program configured to execute a first operation to create a first part of the checkpoint data that is needed to migrate the first process from the source machine to the target machine, the first operation to write the first part of the checkpoint data to a first location in machine-readable media to determine a size of the first part that is needed for migration, wherein the first location in the machine-readable media does not include a location of the file, wherein the write of the first part of the checkpoint data to the machine-readable media is separate from and prior to storage of the first part of the checkpoint data in the file;
a second process executable on the processor in the workload partition, wherein the second process comprises a second checkpoint program configured to execute a second operation to create a second part of the checkpoint data that is needed to migrate the second process from the source machine to the target machine, the second operation to write the second part of the checkpoint data to a second location in the machine-readable media to determine a size of the second part that is needed for migration, wherein the second location in the machine-readable media does not include a location of the file, wherein the write of the second part of the checkpoint data to the machine-readable media is separate from and prior to storage of the second part of the checkpoint data in the file;
wherein the checkpoint module is configured to,
allocate areas within the file for storage of the first part and the second part of the checkpoint data, wherein sizes of the areas are defined by the estimation of the size of the first part and the second part of the checkpoint data provided by the executing of the first and second operations to create the checkpoint data,
defining an offset in the file for the first and second processes;
store the first part and the second part of the checkpoint data, at least partially in parallel, into the areas allocated within the file based on the offset in the file for the first and second processes; and
output the file for the migration of the workload partition from the source machine to the target machine.

9. The source machine of claim 8, wherein first checkpoint program is configured to execute at least partially in parallel with the second checkpoint program.

10. The source machine of claim 8, wherein the first checkpoint program is stored and is configured to execute within a first segment of the first process, wherein the second checkpoint program is stored and is configured to execute within a second segment of the second process.

11. The source machine of claim 10, wherein the first segment and the second segment is not configured to store data needed to create the checkpoint data.

12. The source machine of claim 10, wherein the first segment comprises a text segment in the first process, and the second segment comprises a text segment in the second process.

13. The source machine of claim 8, wherein a size of the checkpoint data for the first process is dependent on creating of the checkpoint data for the second process.

14. A computer program product for migration of a workload partition, the computer program product comprising:
a non-transitory computer readable storage medium having computer readable program code embodied therewith, the computer readable program code configured to,
receive a command for migration of a workload partition from a source machine to a target machine, the workload partition comprising multiple processes, wherein the migration occurs through transmission of a file storing checkpoint data for the multiple processes, wherein the checkpoint data comprises data utilized to reinstantiate states of the multiple processes on the target machine;

stop execution of the multiple processes executing on the source machine;

create the checkpoint data for each of the multiple processes, wherein the creation of the checkpoint data is configured to, execute, for each of the multiple processes at least partially in parallel, a checkpoint data creation operation, wherein an execution of the checkpoint data creation operation comprises, estimate a size of the checkpoint data that is utilized for migration, wherein the estimating is derived by writing the checkpoint data to a location in machine-readable media to determine the size of the checkpoint data, wherein the location in the machine-readable media does not include a location of the file, wherein the writing of the checkpoint data to the machine-readable media to determine the size is separate from and prior to storage in the file, wherein the execution of the checkpoint data creation operation is independent of storing the checkpoint data in the file;

allocate areas within the file for storage of the checkpoint data for each of the multiple processes, wherein sizes of the areas are defined by the estimation of the size of the checkpoint data provided by the checkpoint data creation operation;

define an offset in the file for each of the multiple processes;

store the checkpoint data, for each of the multiple processes at least partially in parallel, into the areas allocated within the file based on the offset in the file for each of the multiple processes; and output the file for the migration of the workload partition from the source machine to the target machine.

15. The computer program product of claim 14, wherein the computer readable program code is configured to, store a first part of the checkpoint data for a first process of the multiple processes at a first offset in the file; and store a second part of the checkpoint data for a second process of the multiple processes at a second offset in the file.

16. The computer program product of claim 15, wherein the first part and the second part are contiguous.

17. The computer program product of claim 15, wherein the checkpoint creation data operation is executed within a segment of each of the multiple processes that is not storing data needed to create the checkpoint data.

18. The computer program product of claim 17, wherein the segment comprises a text segment.

19. The computer program product of claim 14, wherein the areas of the file are contiguous.

20. The computer program product of claim 14, wherein a size of the checkpoint data for a first process of the multiple processes is dependent on creating of the checkpoint data for a second process of the multiple processes.

21. A method comprising:

receiving checkpoint data in a file for migration of a workload partition from a source machine into a target machine, the workload partition comprising a first process and a second process, wherein prior to storage of the checkpoint data in the file, a size of the checkpoint data is estimated at the source machine based on writing the checkpoint data to a location in machine-readable media to determine the size of the checkpoint data for the first process and the second process, wherein the location in the machine-readable media does not include a location of the file, wherein the writing of the checkpoint data to the machine-readable media to determine the size is separate from storage in the file;

instantiating the first process, identified in the checkpoint data, in the workload partition on the target machine;

instantiating the second process, identified in the checkpoint data, in the workload partition on the target machine;

extracting the checkpoint data for the first process that is located at a first offset in the file;

extracting, at least partially in parallel with the extracting of the checkpoint data for the first process, the checkpoint data for the second process that is located at a second offset in the file;

recreating a state of the first process using the checkpoint data that is extracted from the first offset in the file;

recreating, at least partially in parallel with the recreating of the state of the first process, a state of the second process using the checkpoint data that is extracted from the second offset in the file; and resuming execution of the first process and the second process in the workload partition on the target machine.

22. The method of claim 21, further comprising:

instantiating a first checkpoint program within a segment of the first process; and executing the first checkpoint program that causes the extracting of the checkpoint data for the first process and the recreating of the state of the first process.

23. The method of claim 22, further comprising deleting the first checkpoint program after the recreating of the state of the first process.

24. The method of claim 21, further comprising:

instantiating a second checkpoint program within a segment of the second process; and executing the second checkpoint program that causes the extracting of the checkpoint data for the second process and the recreating of the state of the second process.

25. The method of claim 24, further comprising deleting the second checkpoint program after the recreating of the state of the second process.

26. The method of claim 21, wherein a size of the checkpoint data for the first process is dependent on creating of the checkpoint data for the second process.

* * * * *